United States Patent
Platenius-Mohr et al.

(10) Patent No.: US 11,677,861 B2
(45) Date of Patent: Jun. 13, 2023

(54) SYSTEM AND METHOD FOR INTEROPERABLE COMMUNICATION BETWEEN ENTITIES WITH DIFFERENT STRUCTURES

(71) Applicant: ABB Schweiz AG, Baden (CH)

(72) Inventors: Marie Christin Platenius-Mohr, Hirschberg an der Bergstrasse (DE); Somayeh Malakuti, Dossenheim (DE); Thomas Goldschmidt, Karlsdorf-Neuthard (DE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/469,914

(22) Filed: Sep. 9, 2021

(65) Prior Publication Data
US 2021/0409521 A1 Dec. 30, 2021

Related U.S. Application Data

(63) Continuation of application No. PCT/EP2020/056518, filed on Mar. 11, 2020.

(30) Foreign Application Priority Data

Mar. 11, 2019 (EP) .................................... 19161977

(51) Int. Cl.
*G06F 15/173* (2006.01)
*H04L 69/08* (2022.01)

(52) U.S. Cl.
CPC .................................... *H04L 69/08* (2013.01)

(58) Field of Classification Search
CPC ... H04L 69/08; H04L 67/565; H04L 67/2823; G06N 20/00; G06N 5/022

(Continued)

(56) References Cited

U.S. PATENT DOCUMENTS

2018/0205801 A1* 7/2018 Kovacs ................. H04L 67/565
2019/0026386 A1* 1/2019 McWaters ............. G06F 16/258

FOREIGN PATENT DOCUMENTS

| EP | 3726810 A1 | 10/2020 |
| WO | 2017/005817 A1 | 1/2017 |
| WO | 2020/182893 A1 | 9/2020 |

OTHER PUBLICATIONS

European Patent Office, Extended European Search Report in European Patent Application No. 19161977.4, 11 pp. (dated Jul. 24, 2019).

* cited by examiner

*Primary Examiner* — Vivek Srivastava
*Assistant Examiner* — Karina J Garcia-Ching
(74) *Attorney, Agent, or Firm* — Leydig, Voit & Mayer, Ltd.

(57) ABSTRACT

A computer-implemented method for interoperable data exchange between a first real-world entity and a second real-world entity with both real-world entities connected to a same communication network, the first and second real-world entities having first and second digital representations, respectively, each digital representation being a virtual entity replicating data, structure, and functions associated with any one of the real-world entities, the first and the second digital representations having different formats, the method, executed by at least one computing device of the second real-world entity, including: receiving a request for data of the second digital representation to be provided to the first digital representation; evaluating a set of predefined mapping strategies with each mapping strategy being associated with a target model template, by determining a mapping similarity measure for each mapping strategy based on similarities in a structure and semantics of respective data models of the first and second digital representations.

14 Claims, 11 Drawing Sheets

(58) Field of Classification Search
USPC .......................................................... 709/236
See application file for complete search history.

502

503

504

505

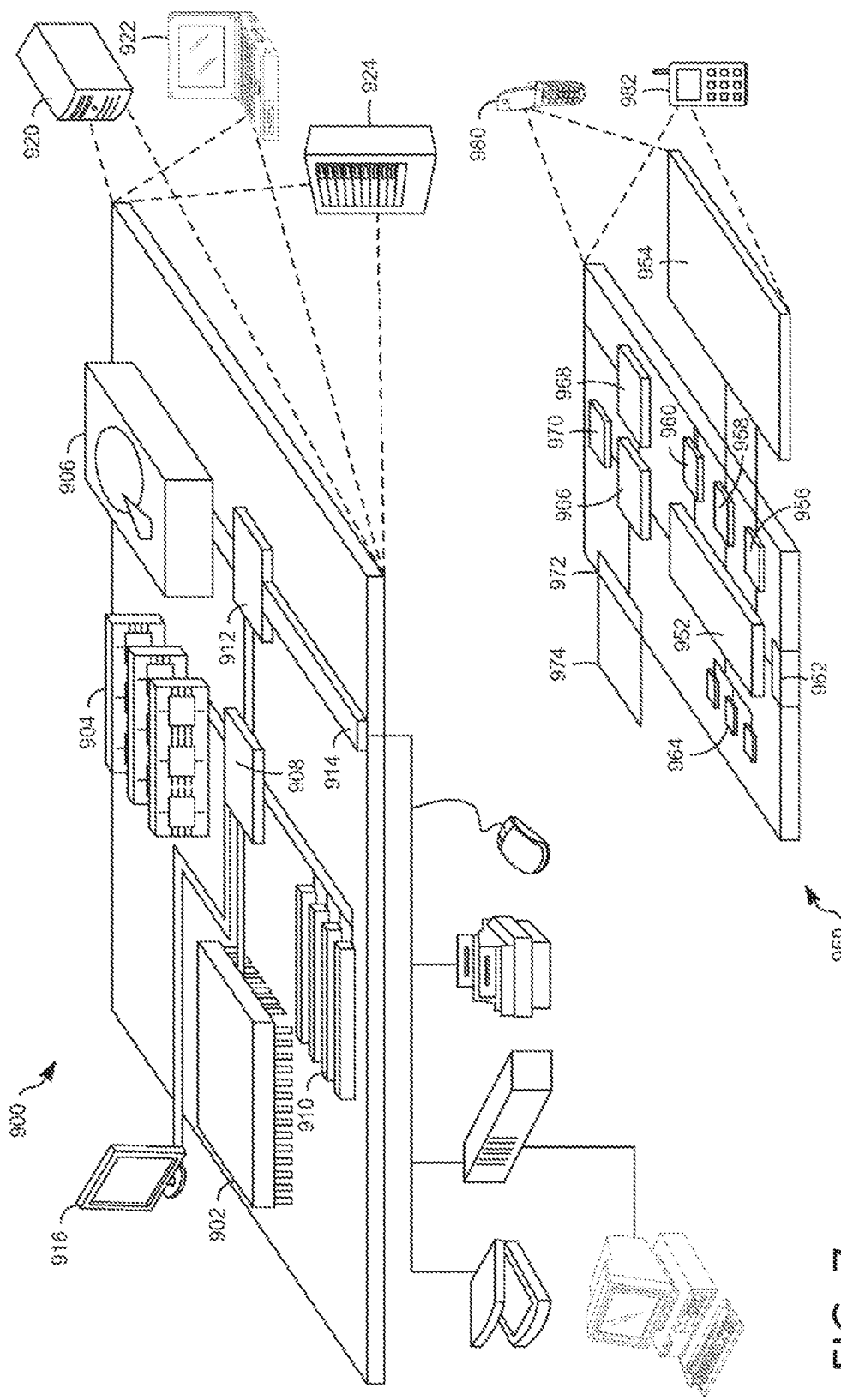

SYSTEM AND METHOD FOR INTEROPERABLE COMMUNICATION BETWEEN ENTITIES WITH DIFFERENT STRUCTURES

CROSS-REFERENCE TO PRIOR APPLICATION

This application is a continuation of International Patent Application No. PCT/EP2020/056518, filed on Mar. 11, 2020, which claims priority to European Patent Application No. EP 19161977.4, filed on Mar. 11, 2019. The entire disclosure of both applications is hereby incorporated by reference herein.

FIELD

The present invention generally relates to electronic data processing, and more particularly, relates to methods, computer program products and systems for interoperable communication between real-world entities.

BACKGROUND

In the course of the digital transformation, many real-world entities, such as for example, companies, plants, cities, etc., have digital representations often referred to as digital twins. Such a digital representation is a virtual entity replicating data, structure and functions associated with the real-world entity and, occasionally, with further related real-world entities. There may be multiple digital twins for a real-world entity, each covering certain aspects of the real-world entity. Often, multiple real-world entities use digital twins in their own (proprietary) formats. If such real-world entities want to exchange digital data, they need to be able to map their own digital twin formats to those digital twin formats of the other real-world entities which are desired communication partners.

Up to now, the creation of such mapping rules is a manual effort which requires an engineer to have a good knowledge about the source and the target formats. As a consequence, the creation of such mappings is tedious and error-prone. Errors in said mappings are an obstacle to interoperable communication between the real-world entities.

SUMMARY

In an embodiment the present invention provides a computer-implemented method for interoperable data exchange between a first real-world entity and a second real-world entity with both real-world entities connected to a same communication network, the first and second real-world entities having first and second digital representations, respectively, each digital representation being a virtual entity replicating data, structure, and functions associated with any one of the real-world entities, the first and the second digital representations having different formats, the method, executed by at least one computing device of the second real-world entity, comprising: receiving a request for data of the second digital representation to be provided to the first digital representation; evaluating a set of predefined mapping strategies with each mapping strategy being associated with a target model template, by determining a mapping similarity measure for each mapping strategy based on similarities in a structure and semantics of respective data models of the first and second digital representations with the corresponding target model templates, so as to provide determined mapping similarity measures; generating a mapping between a format of the first digital representation and a format of the second digital representation, by: selecting at least one mapping strategy from the set of predefined mapping strategies based on the determined mapping similarity measures, mapping the one or more data models which are associated with the requested data of the of the second digital representation to the corresponding one or more data models of the first digital representation by executing the at least one selected mapping strategy, and providing the requested data to the first real-world entity in accordance with the format of the first digital representation via the mapping.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 7 is a diagram that shows an example of a generic computer device and a generic mobile computer device, which may be used with the techniques described herein.

DETAILED DESCRIPTION

Figure 1:
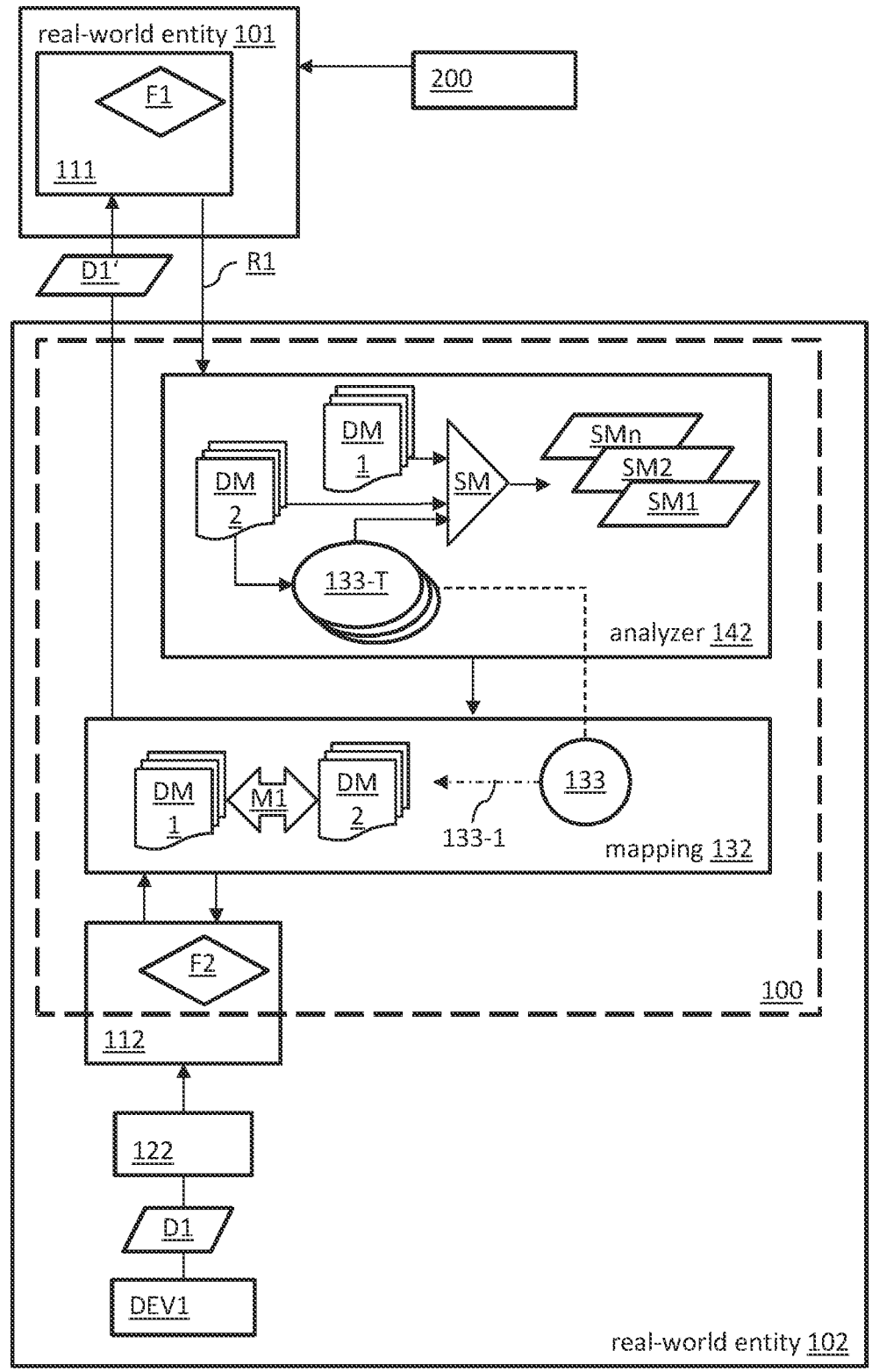
FIG. 1 includes a block diagram of a computer system for interoperable data exchange between two real-world entities according to an embodiment.

In various embodiments the present invention provide systems and methods for interoperable data exchange over a communication network between two real-world entities which use digital representations of different formats to allow a robust, interoperable communication between the real world entities. Thereby, data exchange is defined as the process of taking data structured under a source schema and transforming it into data structured under a target schema, so that the target data is an accurate representation of the source data. Data exchange allows data to be shared between different computer programs. Different formats may differ in the syntax of the respective data models or in the semantics of the respective data models or in both, the syntax and the semantics. Embodiments of the invention as disclosed herein solve this technical problem by generating the required mappings with an automatic generative procedure. As a result, the mapping between the digital representations (digital twins) becomes less error-prone leading thus to a more stable (robust) communication between the real-world entities. In some embodiments, the generated mappings may be stored in corresponding separate mapping models, allowing subsequent customizing of the mappings by a user with specific domain knowledge. The separate mapping model thereby decouples the customizing step entirely from the real-world entities with their proprietary formats, especially in cases where source and target formats change over time.

Many real-world entities (e.g., automation companies) have so-called Internet of Things (IoT) platforms. For example, such platforms offer information models to store and provide access to information about the properties and the behavior of devices in an automation system. Such information models can be used to define digital twins of devices for desired use cases. Typically, each IoT platform adopts its own proprietary format to describe the information models of digital twins. In other words, each digital representation uses data models defined in its own proprietary format providing flexibility for the respective real-world entity to describe the information on a device in an individual way, e.g., tailored to the use cases of the corresponding entity. However, this also hinders the interoperability across multiple IoT platforms and is therefore an obstacle to advanced cross-entity, data-intensive use cases improving the performance and/or reliability of devices. An example use case is predictive maintenance incorporating information from the device running at a first entity and engineering details available at the site of a second entity.

For robust interoperable communication, it is advantageous to share at least parts of the digital twins between different entities for this purpose. For example, each company needs to be enabled to understand and process other companies' proprietary formats. As currently no standards are available, each company tries to map its digital twin into another (e.g., a commonly agreed) format, that target companies can work with. The creation of such mapping rules is typically a manual effort of an engineer which requires a very good knowledge about both the source and the target formats, which makes it error-prone, especially in cases where large numbers of different data objects are involved. Furthermore, every time when either the source or the target format changes, the mapping must be adjusted manually by the engineer which is again an error prone procedure.

Embodiments described herein propose an approach to automatically create by a generative procedure the mapping needed to transform a digital representation (digital twin) of a real-world entity from its proprietary format into the format of another real-world entity for the purpose of interoperability. The approach can also be used if there are multiple standards to define digital twins where it is needed to execute transformations from one standard into another standard.

In one embodiment, a computer-implemented method is provided for interoperable data exchange between a first real-world entity and a second real-world entity. Both real-world entities are connected to the same communication network. The first and second real-world entities have corresponding first and second digital representations. Each digital representation is a virtual entity replicating data, structure and functions associated with any one of the real-world entities. That is, a digital representation of a real-world entity can also include data which originate in other real-world entities. The first and the second digital representations have different formats (i.e., the data models used by the digital representations are different). The method, which is described in the following, is executed by the second real-world entity. That is, the method is described from the perspective of one of the communication partners.

The second real world entity has an interface to receive a request for data of the second digital representation to be provided to the first digital representation. For example, the request may be associated with a data request of an application querying the digital representation of the first real-world entity to provide data which originate in the second real-world entity. In another embodiment, the request may be triggered by a change of the data values of the second digital representation at runtime. At runtime, in this context, refers to the time during which a real-world component is operated and produces data which cause the change of said data values in the second digital representation.

An analyzer module of the second real-world entity evaluates a set of predefined mapping strategies. Thereby, each mapping strategy is associated with a target model template. The target model template indicates the structure and semantics of a target data model into which the respective mapping strategy can transform a corresponding source data model. The analyzer determines a mapping similarity measure for each mapping strategy based on similarities in the structure and semantics of respective data models of the first and second digital representations with the corresponding target model templates. In more detail, each mapping strategy is associated with a set of mapping rules which reflect the potential target data model that can be generated with said rules. For each mapping strategy, the corresponding mapping rules are applied to the source data model(s) of the second representation resulting in a corresponding target model template.

A similarity module determines the similarity measures for each target model template by evaluating structure and semantics of the respective target model template with structure and semantics of the data model(s) of the first digital representation (i.e., the intended structure to which the data model(s) need to be mapped). After this evaluation step, the analyzer can provide the information which of the mapping strategies may lead to a mapping which allows to exchange the data, minimizing errors and information losses.

In one embodiment, the analyzer can determine partial similarity measures for different sub-models of the data models. For example, a particular mapping strategy may lead to a high similarity measure for a sub-set of sub-models. However, this particular mapping strategy may be completely inappropriate for other sub-models. In such a case, the analyzer can generate multiple target model templates for different sub-models where each target model template is based on the rules of a different mapping strategy. The determined mapping similarity measure provides a quantitative measure for the similarity between structure and/or metadata of properties of the one or more data models of the first and second digital representations and the respective target model template and, therefore, provides a measure for the suitability of the respective mapping strategy to generate an appropriate mapping for the desired model transformation. A data model has a particular structure and the leaves of the model structure have metadata, such as for example, the name of the leave element, a unit of measure, a semantic annotation, etc. The similarity measures can be determined based on the similarity of the structures of the respective data models alone, based on the similarity of certain metadata of the properties (leaves) alone, or based on a combination thereof, dependent on the corresponding mapping strategy to be evaluated. A mapping module of the second real-world entity generates a mapping between the format of the first digital representation and the format of the second digital representation. For generating said mapping, the mapping module selects at least one mapping strategy from the set of predefined mapping strategies based on the previously determined mapping similarity measure. The set of predefined mapping strategies can be part of the mapping module or it may be stored within the second real-world entity or even externally on a remote data storage which can be accessed via the interface of the digital representation.

The set of predefined mapping strategies includes at least two of the following strategies:

a structure-preserving mapping strategy adapted to generate a mapping when the structure of the first digital representation resembles the structure of the second digital representation which resembles the corresponding mapping model template of said mapping strategy. For example, when the structure of the first digital representation contains the same number of models resulting in a high structure similarity score, and when the leaves of the source model have a correspondence in the leaves of target model template the structure-preserving mapping strategy can be selected. If said models even contain the same number of leaves, an even higher structure similarity score may be determined resulting in the selection of this strategy.

a minimizing mapping strategy adapted to generate a mapping of the second digital representation data models to a minimum number of first digital representation data models. For example, if the target digital representation has a structure with a minimum number of models (e.g., only one model), this strategy may be selected in accordance with its target model template to aggregate all properties from multiple models of the second digital representation into a single model of the first digital representation without any additional structure.

a maximizing mapping strategy adapted to generate a mapping of the second digital representation data models to a maximum number of first digital representation data models. This strategy is the counterpart to the previous strategy in that the target digital representation has a structure with a maximum number of models (e.g., one model per model leave). That is, each leave element of the second digital representation models is mapped to a separate model of the first digital representation in accordance with the target model template of said mapping strategy.

a name-based-heuristics mapping strategy adapted to generate a mapping to the first digital representation based on domain-specific, customizable heuristics regarding the naming of the elements in the second digital representation. To select this strategy, a similarity between the model elements is detected at the metadata level of the model properties. For example, source model elements beginning with the same character sequence may be mapped to a corresponding target model. Based on these similarities, the target model template can be created and be used to assess the mapping similarity measure between the target model template and the first digital representation.

a semantic-references-based mapping strategy adapted to generate a mapping to the first digital representation based on heuristics regarding semantic references assignable to the elements in the second digital representation. To evaluate this strategy, the analyzer recognizes similarities between model elements based on semantic references annotating the model elements. Such annotations point to a classification allowing to group similar source model elements into respective target models in accordance with the corresponding target model template.

A person skilled in the art may add further mapping strategies to the set of predefined mapping strategies.

The mapping module executes the mapping at instance level of the mappings by executing the selected mapping strategy. That is, the one or source more data models which are associated with the requested data of the second digital representation are mapped to the corresponding one or more target data models of the first digital representation accordingly.

After the mapping has been generated in accordance with the selected strategy, the requested data is provided to the first real-world entity in accordance with the format of the first digital representation via said mapping.

The analyzing and generating steps of the disclosed method may be repeated iteratively to subsequently try multiple mapping strategies until a mapping strategy is identified which results in the best mapping between the source and target formats. A best mapping is defined by showing the highest correspondence between source and target models. In one embodiment the predefined mapping strategies are part of a knowledge base and the knowledge base is optimized after each mapping generation by using a machine learning method which incorporates mapping knowledge learned from previously generated mappings. With the optimized knowledge base the selection of the optimal mapping strategy is facilitated when the mapping situation corresponds to a situation which has already been learned earlier.

In one embodiment, the mapping is persisted in a separate mapping model which is independent of the different formats used by the digital representations. The persisted mapping can be adjusted in case of a change detected in the format of the first or second digital representation. In other words, this separate mapping model decouples the source (original) and the target (transformed) digital representations and thereby allows simple adaption in case of evolution of source and/or target formats.

In one embodiment, customizing input can be received for the persisted mapping and the persisted mapping may be adjusted in accordance with the customizing input. This allows to enhance the persisted mapping with specific domain knowledge later on.

In one embodiment, the generated mapping may be bidirectional and adapted to be applied to an export request from the first digital representation to push data of the first digital representation to the second digital representation.

In one embodiment, the request is received from the first digital representation as a request by the first digital representation to import data of the second digital representation into the first one. This embodiment can be seen as a pull mode where the first entity asks the second entity for particular data.

In another embodiment, the request may be triggered by a change of the data values of the second digital representation at runtime. This may lead to automatically re-execute the mapping in accordance with the change. The second digital representation can then notify the first digital representation about the change and provide the respective updated data. This embodiment can be seen as a push mode where the second entity knows the data of interest to the first entity and automatically provides a notification upon any changes in the data to which the first entity has "subscribed" earlier by launching respective requests.

In one embodiment, a computer program product is provided with instructions that, when loaded into a memory of a computing device and executed by at least one processor of the computing device, execute the method steps of the computer implemented method described herein. For example, the computer program is loaded into a memory component of the second real-world entity and is executed by one or more processors of said entity.

In one embodiment, a computer system is provided for interoperable data exchange between a first real-world entity and a second real-world entity. Both real-world entities are connected to the same communication network. The first and second real-world entities have first and second digital representations, respectively. Each digital representation is a virtual entity replicating data, structure and functions associated with any one of the real-world entities. The first and the second digital representations have different formats.

The computer system includes an interface to receive a request for data of the second digital representation to be provided to the first digital representation, and to provide the requested data to the first real-world entity in accordance with the format of the first digital representation via a mapping.

Further, an analyzer module of the system determines a similarity measure between structure and/or metadata of properties of one or more data models of the first digital representation and structure and/or metadata of properties of one or more data models of the second digital representation by applying similarity metrics to said data models.

A mapping module of the system generates the mapping between the format of the first digital representation and the format of the second digital representation. For this purpose, it firstly selects a mapping strategy from a set of predefined mapping strategies based on the similarity measure. Secondly, it maps the one or more data models which are associated with the requested data of the second digital representation to the corresponding one or more data models of the first digital representation by executing the selected mapping strategy.

The computer system is further configured to execute the functions as disclosed in the context of the disclosed method.

Further aspects of the invention will be realized and attained by means of the elements and combinations particularly described herein. It is to be understood that both, the foregoing general description and the following detailed description are exemplary and explanatory only and are not restrictive of the invention as described.

Figure 2:
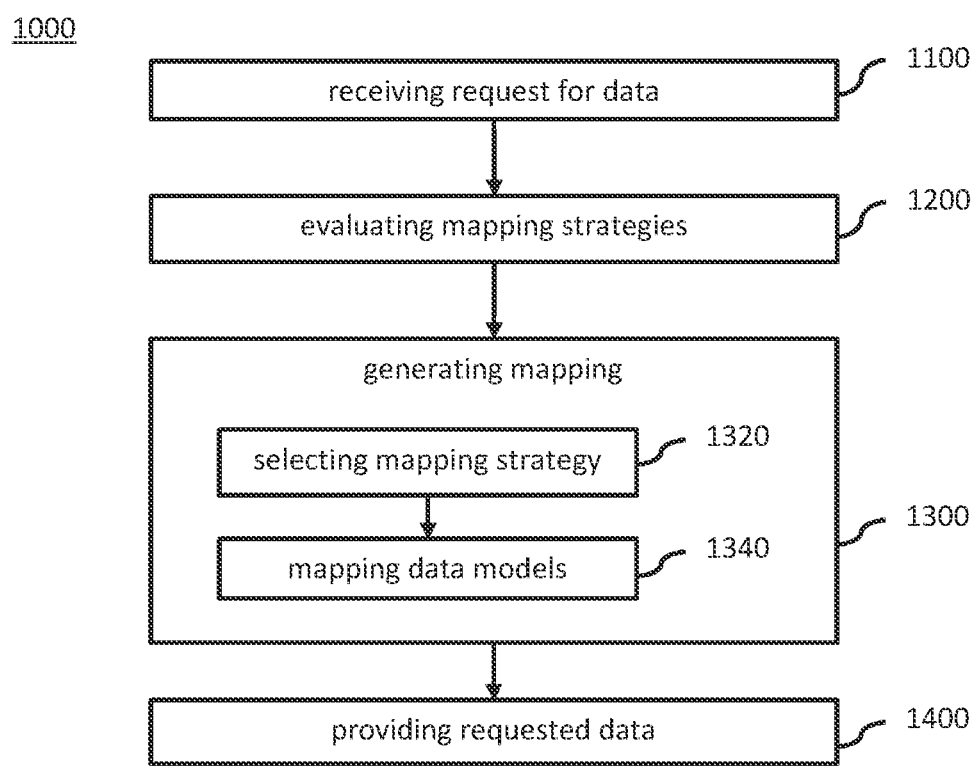
FIG. 2 is a simplified flow chart of a computer-implemented method for interoperable data exchange between two real-world entities according to an embodiment.

FIG. 1 is a block diagram 10 including an example embodiment of a computer system 100 for interoperable data exchange between a first real-world entity 101 and a second real-world entity 102. FIG. 2 is a simplified flow chart of a computer-implemented method 1000 for interoperable data exchange between two real-world entities according to an embodiment. The method 1000 of FIG. 2 is executed by the computer system 100 which is associated with the second real-world entity 102. The description of FIG. 1 refers to the method steps illustrated in FIG. 2. For this reason, reference numbers of FIG. 1 and FIG. 2 are referred to in the following description.

Both real-world entities are connected to the same communication network. For example, the real-world entities may be two companies where each company operates its own intranet. The communication between the real-world entities typically occurs via a wide area network, such as for example, the Internet. The communication inside such a real-world entity can be based on proprietary data models and/or proprietary communication protocols, herein referred to as the proprietary format of this real-world entity. The first and second real-world entities have first and second digital representations 111, 112, respectively. Such digital representations are often referred to as the digital twin of the entity because they are virtual entities replicating data, structure and functions associated with any one of the real-world entities 101, 102. It is to be noted that a digital twin of a real-world entity may comprise multiple models which may cover different aspects of the entity, such as for example, operational data, engineering data, and so on. The digital twins of different real-world entities typically have different formats F1, F2 in that each entity uses its own (often proprietary) data models and communication protocols. In the following the term "entity" is used as an abbreviation for term real-world entity.

In the example, the first entity 101 receives a query from an application 200. The application 200 can be any application which is interested in receiving data provided by the first and/or second entities. For example, the application 200 may be an application which manages the maintenance of certain devices (e.g., DEV1) which are operated within the intranet of the second entity 102. The application may require actual operating data of the device as well as historic data associated with the device as input for a predictive maintenance algorithm. The first entity 101 may only have the historic data available in its own digital representation 111 which could be directly sent to the application as a response to the query. However, the first entity has no information in its own digital representation 111 regarding the actual device operating data of the device DEV1 operated by the second entity 102. The digital representation 112 can provide such current operating data D1 of the device DEV1. For example, the device DEV1 may be a device (e.g., a controller or a sensor) of an automation system which is operated by the second entity 102 via edge 122 on a private Internet of Things platform. The device DEV1 may automatically push its actual operating data to the digital representation 112. Unfortunately, the digital representation 112 of the second entity 102 has a format F2 which differs from that of the first representation. So any request R1 which is sent by the first entity 101 to the second entity 102 via appropriate interfaces to the wide area network will not be understood by the second entity because the data models DM1 of the digital representation of the first entity 101 are different from the data models DM2 of digital representation of the second entity.

In order to be able to respond to the request R1, the second entity 102 has to perform a corresponding mapping which allows to map said data D1 to data D1' into a format which can be understood by the first entity 101. The mapping function is performed by a computer system 100 which is associated with the second entity 102. In the example, the computer system 100 is shown as an integral part of the second entity. However, it is to be noted that the system 100 may also be operated outside the physical intranet of the second entity (e.g., by an external service provider in the form of a remote service). In scenarios where the computer system 100 is operated by the second entity 102 itself, the digital representation 112 is advantageously an integral component of the computer system 100. However, in remote service scenarios, the digital representation 112 is advantageously stored within the physical network of the second company 102 but the computer system would 100 would access the digital representation via a respective interface.

Once the second entity 102 has received 1100 the request IR1 for data D1 to be provided by the second digital representation 112 to the first digital representation 111, the computer system 100 generates 1300 an appropriate mapping M1 to provide the requested data D1 to the first entity 101 in accordance with the format F1 of the first digital representation 111 (as data D1') via said mapping M1. In more detail, the computer system 100 has an analyzer module 142 to evaluate 1200 a set of predefined mapping strategies 133 and to finally select 1320 one or more appropriate mapping strategies to generate 1300 said mapping. Each mapping strategy 133 is associated with a target model template 133-T. The target model template describes a target model to which a source model can be mapped with the corresponding mapping strategy. A mapping similarity measure SM1 to SMn is determined for each mapping strategy 133 based on similarities in the structure and semantics of respective data models DM1, DM2 of the first and second digital representations with the corresponding target model templates 133.

In more detail, each mapping strategy 133 is associated with a set of mapping rules reflecting the potential target data model that can be generated with said rules. Such mapping rules are now applied to the source data model(s) DM2 of the second entity 102. That is, for each mapping strategy 133, the corresponding mapping rules are applied to the data model(s) DM2 of the second representation 112 which are related to the requested data D1 resulting in a corresponding target model template 133-T for each mapping strategy. For some mapping strategies, when generating the target model templates, the similarity of single model elements of the data model DM1 of the first digital representation may be evaluated (e.g., their names for the name-based strategy as later explained later on in the context of FIG. 5D). The similarity between such data elements may be expressed as an element similarity measure.

A similarity module SM determines the similarity measures SM1 to SMn (i.e., values representing a similarity) for each target model template by evaluating structure and semantics of the respective target model template with structure and semantics of the data model(s) DM1 of the first digital representation (i.e., the intended structure to which the data model(s) DM2 need to be mapped). After this evaluation step, the analyzer 142 can provide the information which of the mapping strategies may lead to a mapping which allows to exchange the data D1 without any errors or losses. There may be multiple mapping strategies leading to the same similarity measure. In such cases, the computer system may decide for any of such strategies.

It is also possible for the analyzer to determine partial similarity measures for different sub-models of the data models DM1, DM2. That is, DM2 may include a plurality of sub-models for which a particular mapping strategy leads to a high similarity measure. However, this particular mapping strategy may be completely inappropriate for other sub-models of DM2. In such a case, the analyzer can generate multiple target model templates for different sub-models where each target model template is based on the rules of a different mapping strategy. That is, the analyzer can try various mapping strategies for different sub-models which may result in higher similarity measures than the application of a single mapping strategy to the entire data model(s) DM2.

The decision about which mapping strategies are to be used by the computer system 100 is finally taken by the mapping module 132. The mapping module 132 generates the mapping M1 between the formats F1 and F2. Firstly, the mapping module selects at least one mapping strategy from the set of predefined mapping strategies 133 based on the determined similarity measures SM1 to SMn. In a straight forward example, the analyzer provides a set of similarity measures where one of the measures clearly indicates a maximum value for a particular mapping strategy. In this case, the mapping module will simply select the strategy associated with the highest similarity measure. In cases where multiple strategies are evaluated with an equally high similarity measure, the mapping module may simply select any one of those strategies as they appear equally suitable for the mapping generation. In cases where the analyzer provides multiple similarity measures for various sub-models wherein such similarity measure relate to different mapping strategies for the same source model(s) the mapping module selects multiple mapping strategies. In general, the mapping strategies are selected 1320 by the mapping module in such a way that the overall similarity for the mapping between source and target models is maximized. In other words, a mapping strategy which results in a model structure with model elements having the highest similarity with the target model is selected by the mapping module. Once the one or more mapping strategies are selected, the mapping module 132 maps 1340 the one or more data models DM2 which are associated with the requested data D1 of the of the second digital representation 112 to the corresponding one or more data models DM1 of the first digital representation by executing the one or more selected mapping strategies. In other words, the actual mapping between the data models occurs at the level of model element instances. This final mapping 1340 allows to define the mapping links between the model elements of DM1 and DM2. Once this mapping is generated, the computer system 100 can provide the transformed data D1' in accordance with the format F1 of the first representation to provide 1400 the requested data D1 to the first entity in the format which is understood by the first representation 111.

Now, the first representation is in possession of all data needed to respond to the query of the application 200. It is to be noted that the scenario disclosed in the context of FIG. 1 is explanatory only in that the request R1 is sent by the first entity in response to an application query. Further embodiments are possible, like for example, the embodiment illustrated in FIG. 3B where the request is actually triggered by the second entity itself in response to the detection of a change in the structure or data of the second representation 112. The disclosed mechanism allows two real-world entities with different formats to exchange data without any need for human interaction. The data-exchange is reliable and robust (i.e., has a low probability for data exchange errors) because of the flexible selection of mapping strategies for dynamic generation of the respective mappings on the fly taking into account the actual data models in the different formats.

Figure 3A:
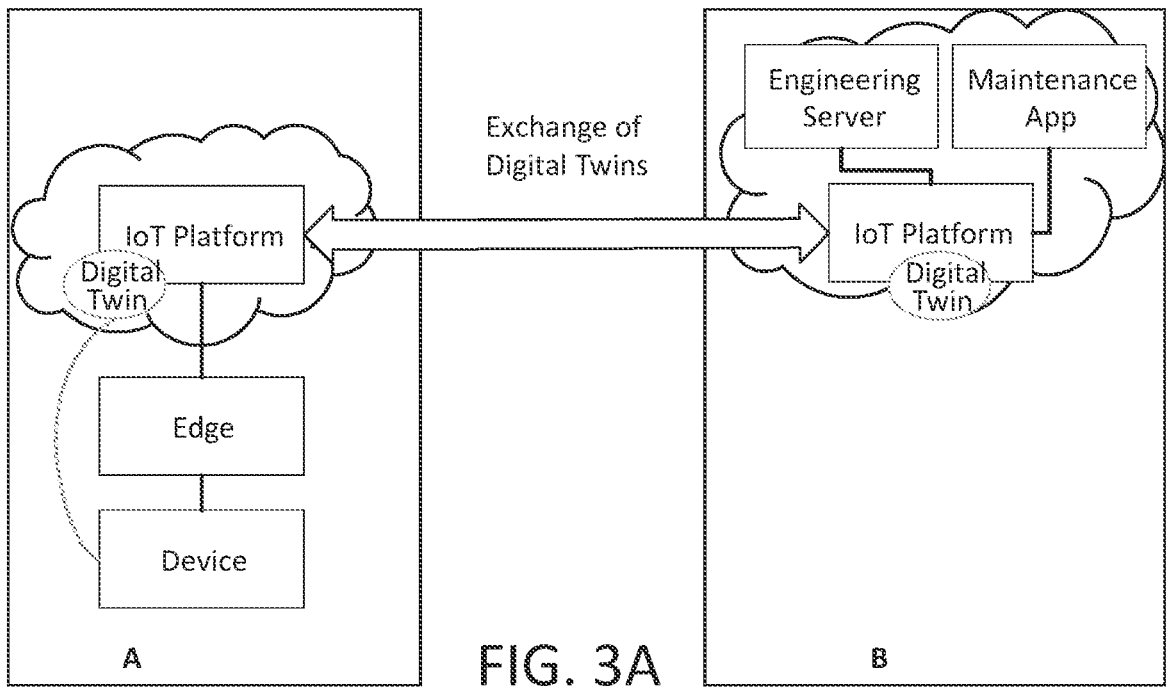
FIGS. 3A, 3B illustrate a detailed implementation example for data exchange between two entities according to various embodiments.

FIG. 3A illustrates a particular embodiment 301 with two companies A, B as real-world entities which exchange data between their digital twins (i.e. their respective digital representations) representing the respective IoT platforms. Each company is operating its own IoT platform. In company A, devices are connected via edge nodes to the IoT platform to provide device specific data to the digital twin of company A. In edge computing in general, the aim is to bring the intelligence, analytics, computing, communications etc. very close and increasingly into devices such as programmable logic controllers and other, ever more powerful and smaller, devices at the edge and, after analysis etc., to the appropriate system or the cloud. The device data can be static data such as for example, a serial number or a device type, and can also include operational data such a sensor values or other technical parameter values reflecting the internal state of the device. Company B may operate various application systems, such as for example an engineering system and a maintenance system linked to the IoT platform of company B. The engineering system may provide engineering data which relate to the device of company A via an engineering server to the digital twin of company B. Similarly, a maintenance application of the maintenance system may provide data associated with the maintenance of said device. For example, by enabling data exchange between the digital twins of company A and B the data available in the content of the digital twin of company B can automatically be enriched with the operational device data provided by the digital twin of company A although both digital twins use different formats.

Figure 3B:
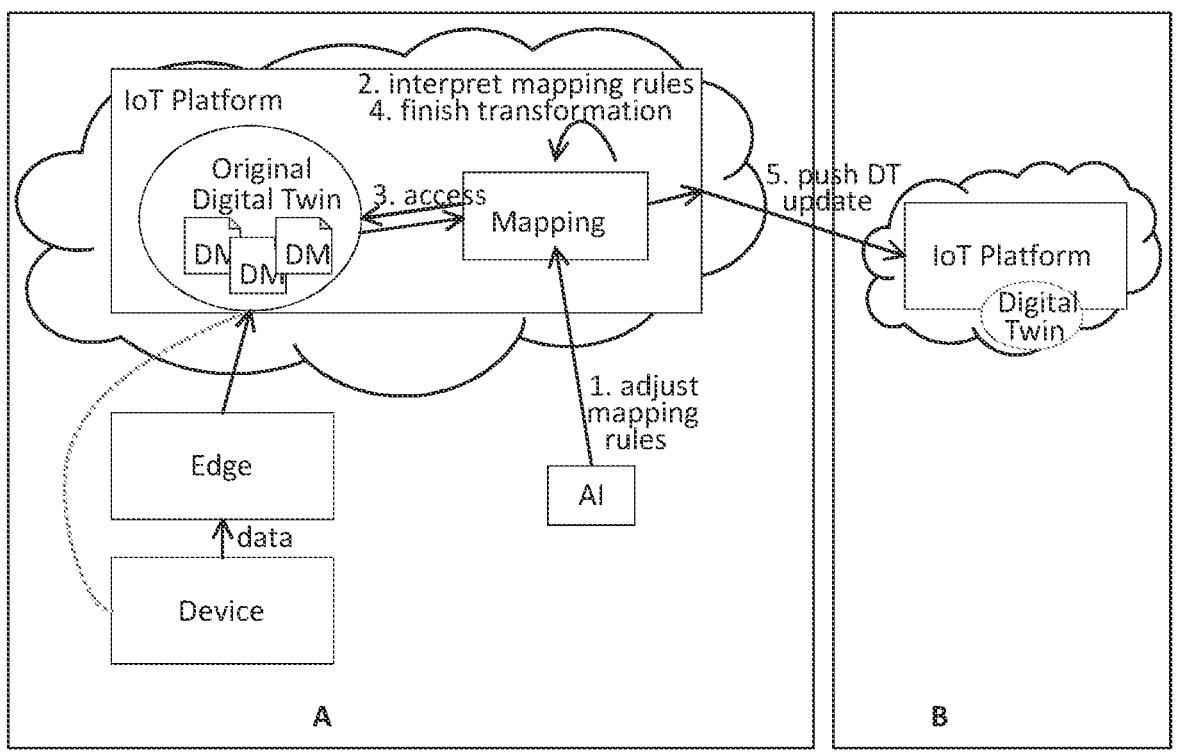

FIG. 3B illustrates a push scenario 302 where company A can actively push data from its own original digital twin to company B to update the digital twin of company B. The overall scenario is similar to the embodiments described in FIG. 1 and FIG. 3A. However, the IoT platform of company A in this embodiment has a monitoring module which is configured to detect changes which occur in the data values or the structure of the data models DM* with regards to its original digital twin. In this push embodiment, the request (cf. request R1 in FIG. 1) which triggers that mapping and transformation steps is not received from company B but rather is launched by the monitoring module upon the detection of such a change. It is assumed that the mapping between original digital twin of A and the digital twin of B is persisted in the IoT platform of A as a separate mapping model which is independent of the formats of the two digital twins. In case a structure change of the original twin of company A is detected, the persisted mapping model, that is the mapping rules which have been applied to the original digital twin, is adjusted. It is to be noted that the monitoring module may also be configured to receive such changes in the structure of the digital twin of B via the corresponding interfaces. In such a case, the mapping request may also be triggered by the detection of structure change in B. For example, the adjustment of the mapping rules may be driven by an artificial intelligence component AI which is configured to learn new mappings over time when changes occur. This knowledge can then be applied to adjust 1 the previously persisted model rules in accordance with the detected change.

In an alternative embodiment, the mapping may be adjusted by receiving customizing input for the persisted mapping model, for example, via a human-machine interface of the IoT platform of company A which allows a user to edit and adjust 1 the persisted mapping, for example, based on respective domain knowledge.

The adjusted mapping is interpreted 2 by the analyzer and applied 3 to the digital twin of company A (i.e. the second representation) to generate an adjusted target model template, and to re-determine the corresponding similarity measures. The mapping module can then again select one or more mapping strategies based on the re-determined similarity measures and finally finish 4 the transformation (mapping) as disclosed in FIG. 1. The data of the digital twin of company A is now available in a format which is compatible with the digital twin of company B and can be provided in push operation 5 to company B for updating, no matter whether the structural change has occurred in company A or B.

Alternatively, or in addition to the detection of a structural change, the monitoring module may detect at runtime a change of the data (i.e., the values) provided by the device to the digital twin of company A. In this case, the request may be triggered by the value change, too. When a change in the data values is detected there is no need for adjusting the mapping rules. Rather, the already existing mapping rules can be re-executed in accordance with the change, and the digital twin of company B is notified about the data change when providing the updated data to company B.

Figure 4:
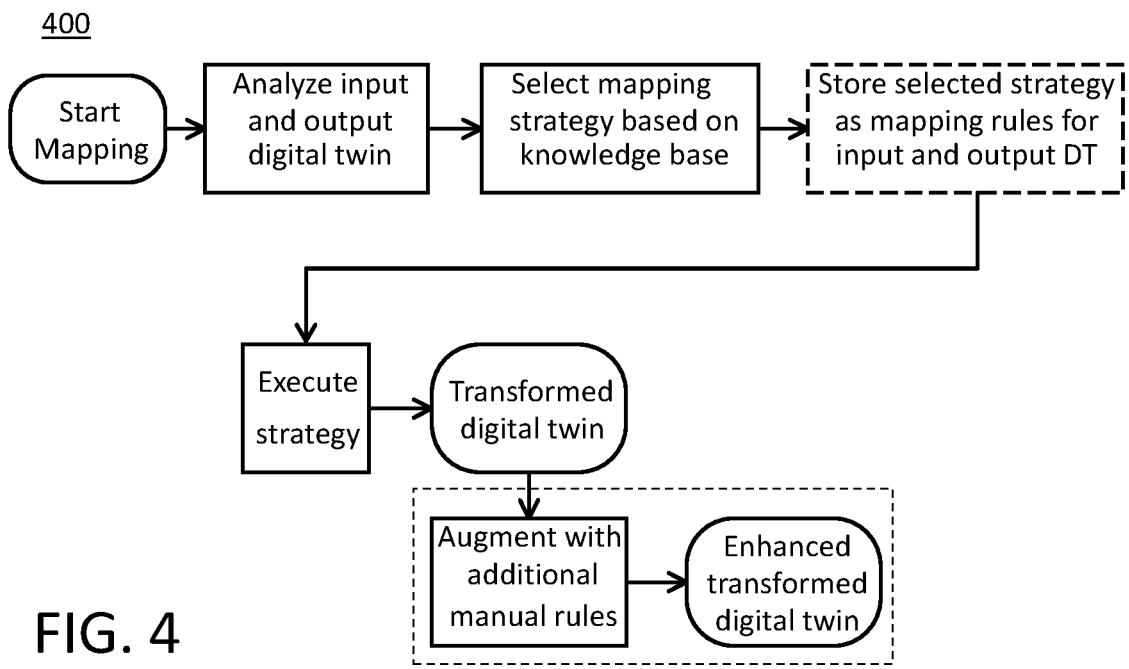
FIG. 4 is a simplified flow chart with steps to generate mappings between different formats of the two real-world entities according to an embodiment.

FIG. 4 provides a further view 400 on the steps which lead to the generation of the mapping between the data models of the two entities. Thereby, the steps within dashed boxes are considered to be optional steps. As explained previously, the generation of the mapping starts with analyzing the data models of the digital twin providing the input to the intended transformation and the digital twin being the output (target) of the transformation. One or more mapping strategies are selected based on a pre-existing knowledge base which includes the domain knowledge related to the two digital twins DT. The associated mapping rules can be stored as a template for future mappings between the respective data models. Finally, the selected at last one strategy is executed resulting in the transformed digital twin. Optionally, the computer system may allow a user to edit the mapping rule via a human-machine interface and augment such rules by additional manual rules which may further improve the final mapping thus leading to an enhanced transformed digital twin.

In the following description of FIGS. 5A to 5E, various examples of mapping strategies are discussed with the structure of the source data model(s) of the second digital representation illustrated to the left of the arrows symbolizing the respective format transformations, and the target data model(s) of the first digital representation illustrated to the right of said arrows. It is to be noted that the set of predefined mapping strategies from which one or more mapping strategies are finally selected by the mapping module includes at least two of said mapping strategies.

Figure 5A:
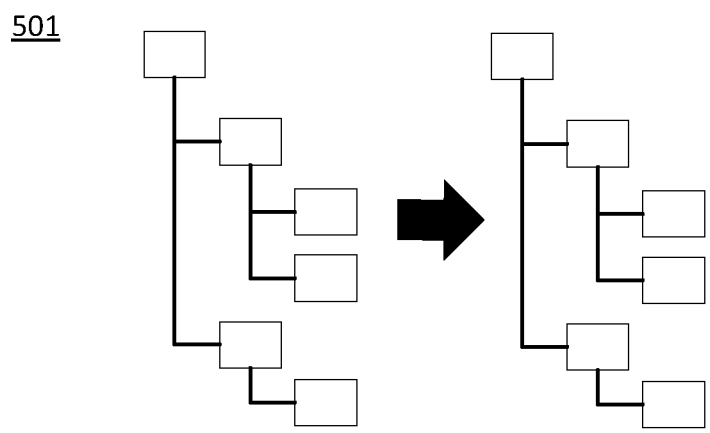
FIGS. 5A to 5E illustrate the concepts various mapping strategy examples according to various embodiments.

FIG. 5A illustrates an example of a structure-preserving mapping strategy 501 adapted to generate a mapping when the structure of the first digital representation resembles the structure of the second digital representation in accordance with a corresponding target model template. When the analyzer module evaluates the structure-preserving strategy, the associated mapping rules are applied to the source data models. In the example 501 the source data models include two sub-models with the upper sub-model including two leaf elements and the lower sub-model including one leaf element. Thereby, a target model template is generated as illustrated on the right which entirely preserves the structure of the source data model(s). This target model template is then compared with the structure of the target model(s) of the first entity. If the structure of the generated target model template resembles the structure of the target model(s) the structure-preserving strategy may be a good candidate to generate the intended mapping between the respective (digital twin) formats. However, to evaluate a similarity degree, the analyzer also takes into account the semantics of the leaf elements. Even in the case that there is a perfect match at the structure level only a low similarity measure would be determined if there is no similarity at the semantic leaf element level. However, if there is also high similarity between the semantics of the leaf elements, a high similarity measure is determined by the analyzer for this strategy.

For example, a drive's digital twin may include three models in the source data model (e.g., one model including operational data, one model containing links to documentation material, and one model describing maintenance data). This source model would be transformed into a digital twin target format where the source model structure is maintained such that also the target digital twin contains exactly three models with the same content as the original digital twin. The way the source and target models as well as their contents are modeled may differ depending on the concepts of the target format. For example, different attributes might be used to describe the nature of the content.

Figure 5B:
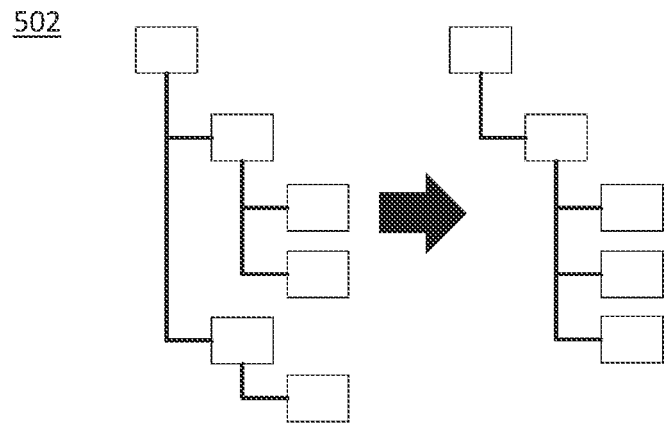

FIG. 5B illustrates an example of a minimizing mapping strategy 502 adapted to generate a mapping of the second digital representation data models to a minimum number of first digital representation data models in accordance with a corresponding target model template. In the example 502 the same source data model is used as in FIG. 5A. However, the format of the intended target model includes only a single sub-model with three leaves. That is, the format of the first representation includes a minimum number of models with a flat list of leaf elements. For evaluating the minimizing strategy the analyzer applies the mapping rules associated with this mapping strategy to the source data model(s) and generates a target model template with only one sub-model and a flat list of leaf elements. This target model template is then again compared with the intended target model and the respective similarity measure is determined.

For example, a digital twin with the second representation including three models needs to be transformed into a target digital twin with one model that aggregates all properties from the three source models, without any additional structure. Such a strategy is useful in cases, e.g., where the source digital twin was used for use cases which are very different from use cases the target digital twin was used for. In such a scenario, typically the structure of the source digital twin would not add value to the target digital twin.

Figure 5C:
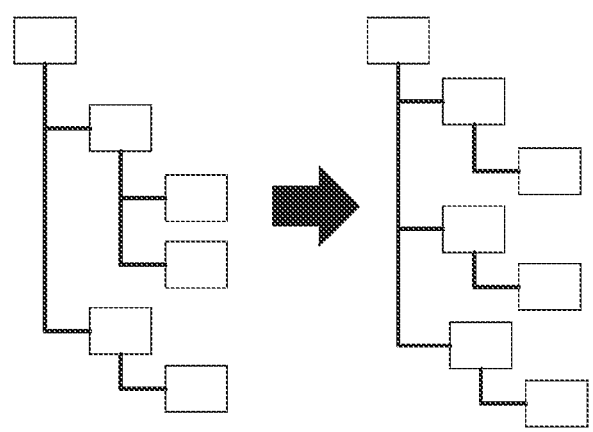

FIG. 5C illustrates an example of a maximizing mapping strategy 503 adapted to generate a mapping of the second digital representation data models to a maximum number of first digital representation data models in accordance with a corresponding target model template. The maximizing strategy 503 can be seen as the opposite to the minimizing strategy 502 of FIG. 5B. In the example 503 the same source data model is used as in FIG. 5A. However, the format of the intended target model includes single sub-model for each leaf element. That is, the format of the first representation includes maximum number of models corresponding to the number of leaf elements of the source data model(s). For evaluating the maximizing strategy, the analyzer applies the mapping rules associated with this mapping strategy to the source data model(s) and generates a target model template with as many sub-models as leaf elements. This target model template is then again compared with the intended target model and the respective similarity measure is determined.

For example, such a strategy may be useful in cases where a target digital twin serves as a basis of many models foreseen by an engineer. Typically, mappings generated on the basis of the maximizing mapping strategy require further customization by a user or a machine learning algorithm later on in the mapping process.

Figure 5D:
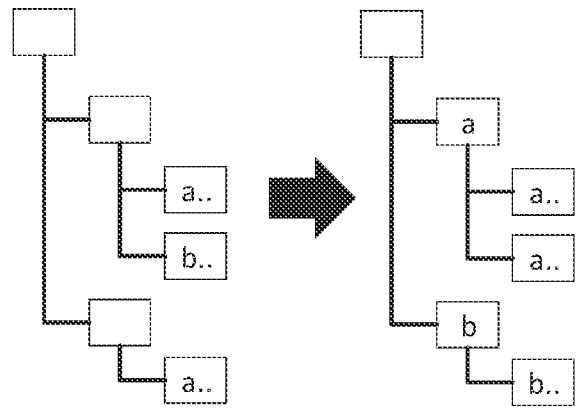

FIG. 5D illustrates an example of a name-based-heuristics mapping strategy 504 adapted to generate a mapping to the first digital representation based on domain-specific, customizable heuristics regarding the naming of the elements in the second digital representation in accordance with a corresponding target model template. In the example 504, the mapping rules to generate the target model template analyze the source model with regards to leaf model elements with regards to the naming of the elements. For example, there are two model leaf elements including "a. . . . ". The mapping rules implement the assumption that such leaf elements showing such name-based similarities can be grouped in a corresponding sub-model of the target model template. In the example, a sub-model "a" is generated with leaf elements "a. . . . ". For the leaf element with the name "b. . . . " in the source model, a corresponding sub-model "b" with a respective leaf element "b. . . . " is generated in the target model template. In the next step a similarity measure for the similarity between the generated target model template with the actual data model(s) of the first digital representation is determined.

For example, there may be rules like "model elements of the source data models with a name beginning with 'Motor*' are always assigned to a 'motor' model" of the target data model(s), or "source model elements containing a string '*service*' in their name always are mapped to a 'maintenance model'", or "source model elements named 'SerialNumber' always are mapped into an 'identification' model, if existing". Different sets of such rules can be added to the mapping rules as a customizing input received from engineers, and are then loaded into the mapping module at runtime.

Figure 5E:
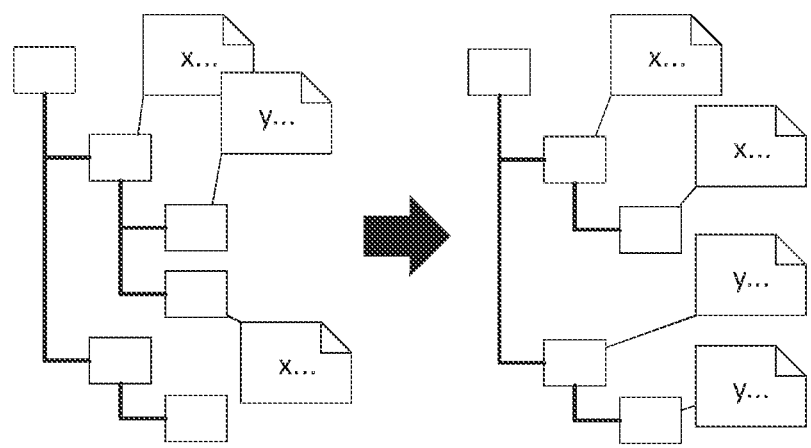

FIG. 5E illustrates an example of a semantic-references-based mapping strategy 505 adapted to generate a mapping to the first digital representation based on heuristics regarding semantic references assignable to the elements in the second digital representation models in accordance with a corresponding target model template. In other words, the target model template for the digital twin of the first entity is generated based on heuristics regarding the semantic references that are assigned to the model elements of the data model(s) of the second digital representation (i.e., the source digital twin). In the example 505, the model element for the first sub-model has an annotation "x . . . ". Further, the second leaf element of this sub-model has the same annotation "x . . . ". The mapping rules associated with this mapping strategy generate a corresponding sub-model in the target model template which groups all model elements with the annotation "x . . . " wherein the structure of the source model is at least preserved in that model elements (nodes) representing a sub-model stay sub-model nodes also in the target model template, and model leaf elements of the source model stay model leaf elements in the target model template. The example 505 further illustrates a mapping rule of the semantic-references-based mapping strategy where a model leaf element of the source model is annotated with "y . . . " but not corresponding annotation does exist for a sub-model element of the source model. In this case the mapping rule generates a respective sub-model node with the annotation "y . . . " in the target model template and groups all model leaf elements with the annotation "y . . . " under this sub-model. For example, model elements in the source/target models may be annotated with semantic references containing links to a global dictionary (e.g., eClass) and thereby attaching semantics to the elements. According to these semantic references, the elements are grouped into the corresponding sub-models of the target model template. Again, the similarity of the generated target model template with the target digital twin (the first representation) is determined.

Finally, after all mapping strategies, which are available in the predefined set of mapping strategies, are evaluated, the system can select at least one of the evaluated strategies for the actual data transformation. Advantageously, the mapping strategy with the highest similarity measure is selected. In case of multiple mapping strategies resulting in the same similarity measure value, any one of such strategies can be selected (e.g., randomly). An example where a mix of mapping strategies is selected is discussed in more detail in the context of FIG. 6D.

Figure 6A:
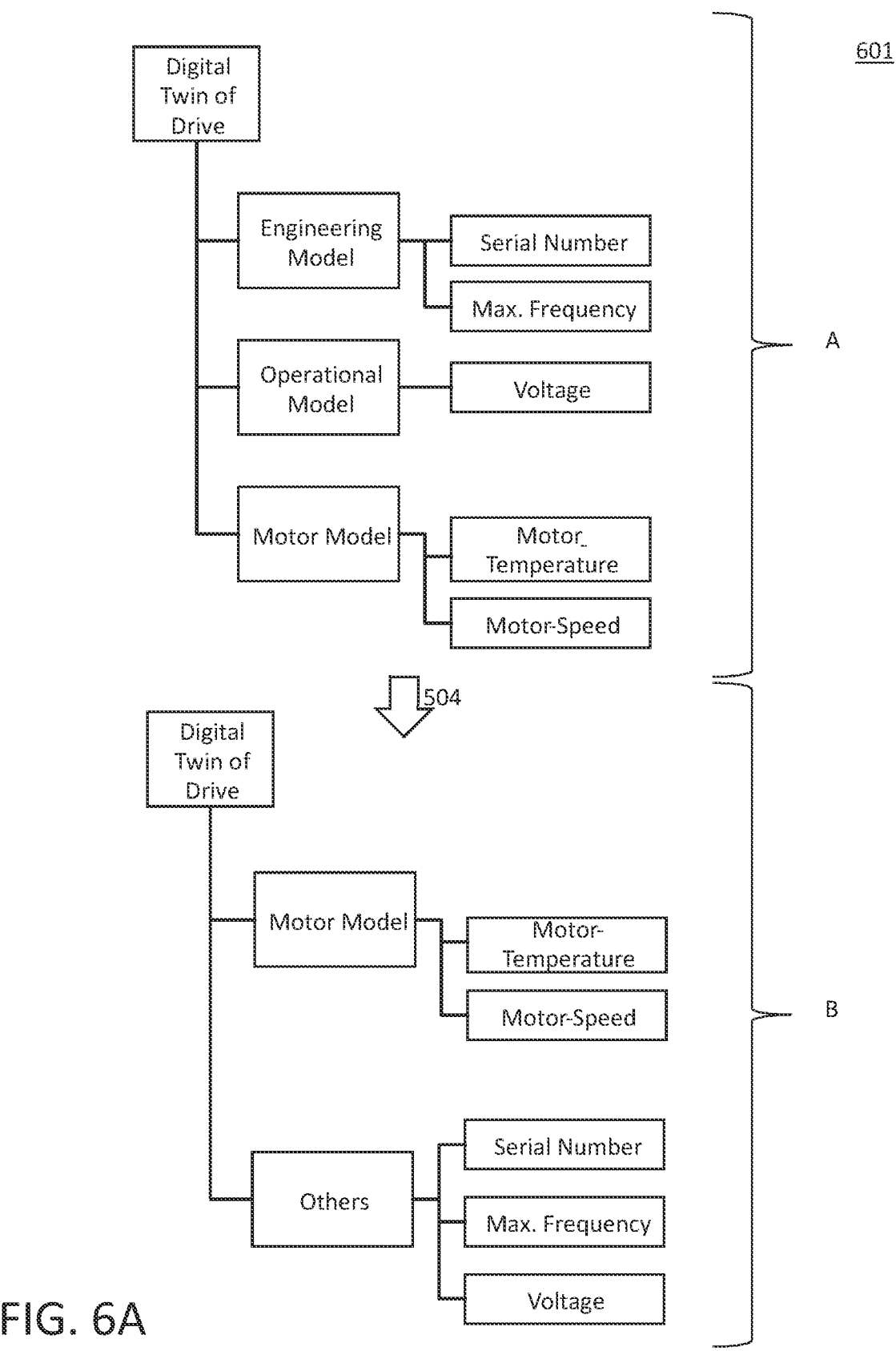
FIGS. 6A to 6D illustrate specific mapping examples by using various mapping strategies.

FIG. 6A illustrates an example 601 where a digital representation reflecting the digital twin of a drive in a format of entity A is transformed into the digital twin of entity B reflecting said drive in the format of entity B. The source data models of A are shown above the arrow 504 representing the selected mapping strategy (name-based-heuristics mapping strategy). By way of example, the evaluation of the mapping strategies is discussed by only looking at the structure preserving strategy and the name-based-heuristics mapping strategy. When the target model template is generated for the structure preserving strategy, the "Motor Model" the source data models would indeed be mapped to the "Motor Model" of the target digital twin. However, for the remaining sub-models "Engineering Model" and "Operational Model" the target model template would not resemble the target data model of B. Therefore, the similarity measure would be below 50% as only two out of five model leaf elements of the source could be mapped to corresponding elements of the target.

When evaluating the name-based strategy, the mapping of the "Motor Model" is similarly good as with the structure-preserving strategy. The respective mapping rule is to group all model elements containing "Motor" as part of their names into the corresponding "Motor Model" of the target. With regards to the remaining leaf elements "Serial number", "Max. Frequency", and "Voltage", no common naming elements are found. The mapping strategy has a rule to cope with this situation by grouping all elements with no common naming part into a sub-model "Others". This sub-model performs like a collector for all elements with names which have no common strings with other names. The target model template generated based on this strategy has a very high (e.g., 100%) match with the data models of the target digital twin of B. As a consequence, the mapping module selects the name-based mapping strategy 504 and executes the mapping for the transformation of the source format into the target format. More in general, a similarity measure can be computed by different algorithms and different implementations. The common trait among these algorithms is that they compare two elements, or two (structured) groups of elements, based on the element's properties (e.g., names, location within structures, other kinds of metadata) and determine an ordinal score, e.g., a percentage value. The higher the similarity, the higher is the returned score.

Figure 6B:
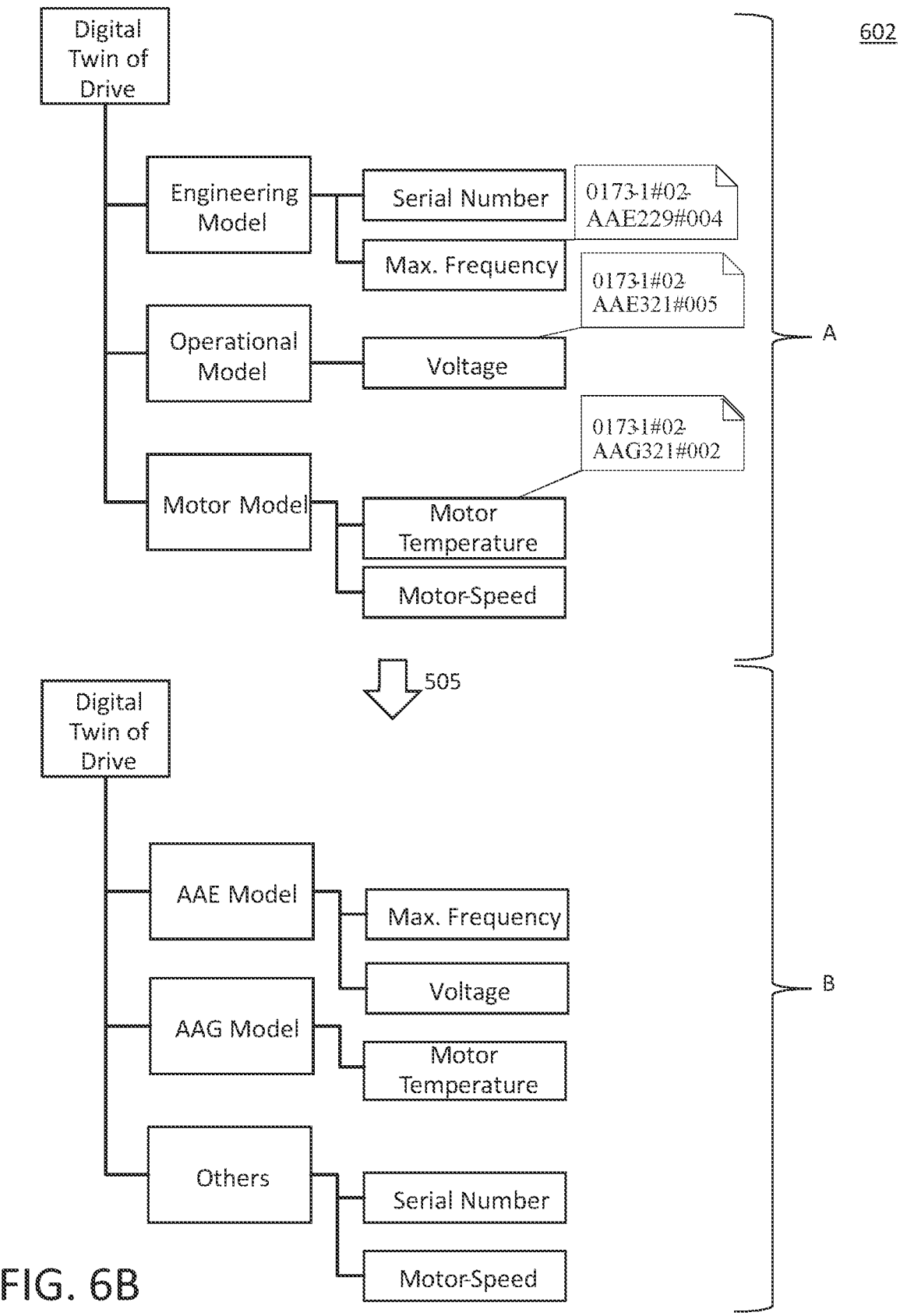

FIG. 6B illustrates an example 602 where a semantic-references-based mapping strategy 505 is selected. When evaluating the structure-preserving strategy, indeed the source and target formats look alike when only comparing the mere structure of the models. On both sides, there are three sub-models with two of them having two leaf elements and one having a single leave element. However, when now checking the semantics of the source model leaf elements and the target model leaf elements, there is no match at all. In other words, the groupings of the source models cannot be mapped to the groupings of the target models. As a consequence, the similarity measure for the structure-preserving strategy in this example would be very low, e.g., "0"—depending on the implementation of the similarity score—despite the initial similarity when looking at the model structures alone. The similarity measure (i.e., the value or score reflecting the degree of similarity) may be computed in various ways by a person skilled in the art. For example, the score may take into account the percentage of all matching elements at the model element leaf level or it may consider similarities which relate to portions of the data model(s).

In this example 602, some source model leaf elements have semantic annotations indicating references to some standard classification. The annotation "0173-1 #02-AAE229 #004" of "Max. Frequency" indicates that there is a reference to a model with an "AAE" classification. The same is true for the annotation "0173-1 #02-AAE229#005" of "Voltage". As a result, the mapping rules of the semantic-references-based mapping strategy 505 group such model leaf elements into the "AAE Model" of the target model template. Similarly, the source leaf element "Motor Temperature" is assigned to the "AAG Model" of the target model template by evaluating the annotation "0173-1 #02-AAG321 #002" of the corresponding source leaf element with a corresponding mapping rule. The corresponding mapping rules in this example analyze the semantic references for string components which correspond to predefined target models. For example, such predefined target models may be the target for leaf elements for which a part of the semantic reference string indicates an association of the corresponding model element with a certain technical specification (e.g., AAE, AAG, etc.). Similar as with the name-based mapping strategy, the semantic-references-based strategy source leaf elements without annotations may be grouped into an "Others" sub-model of the target model template. When now comparing the generated target model template with the format of the digital twin of B there is a 100% match (i.e., similarity measure=1). That is, from the two discussed mapping strategies the mapping module clearly selects the semantic-references-based mapping strategy resulting in the highest similarity measure.

Figure 6C:
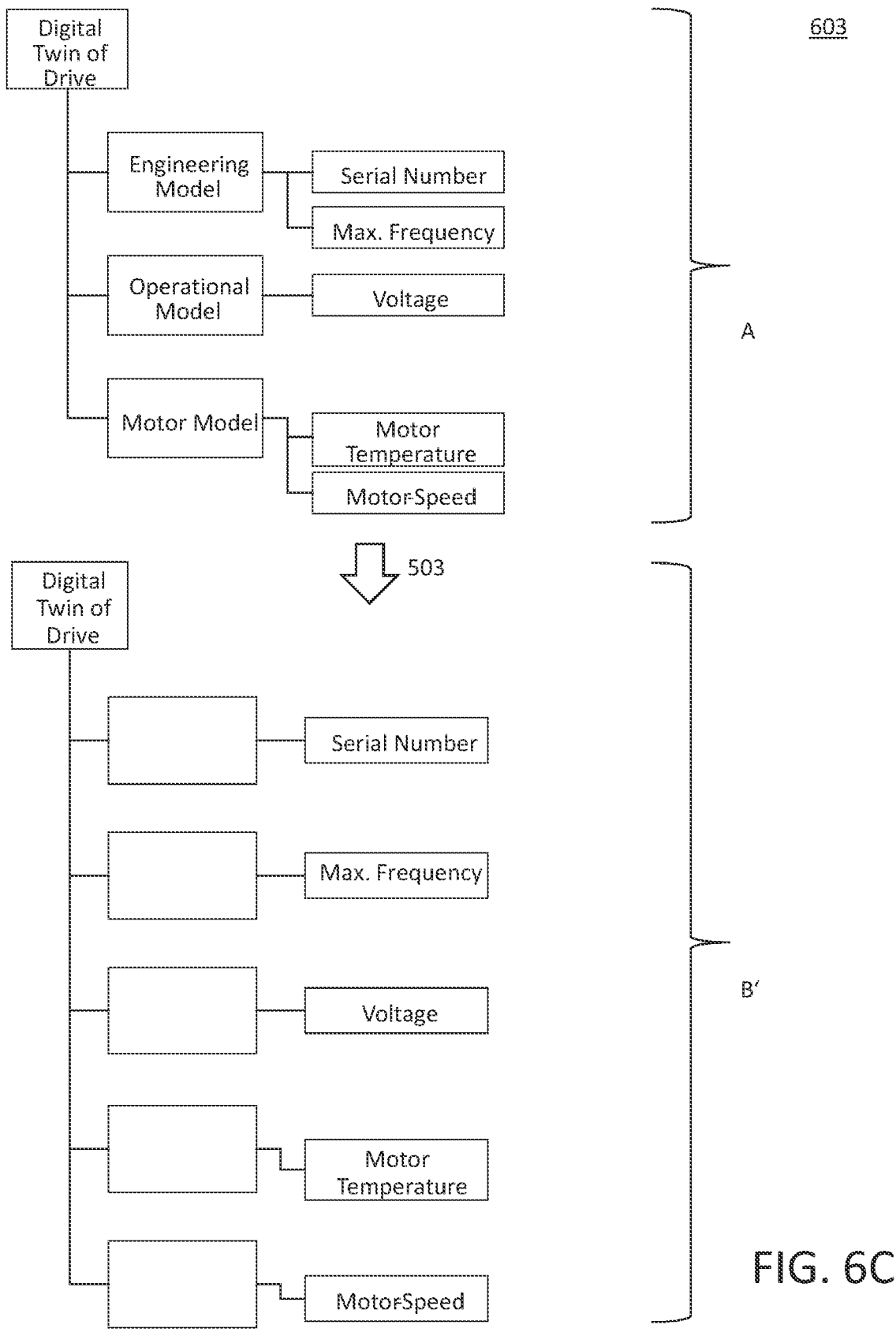

FIG. 6C illustrates an example 603 where a maximizing mapping strategy 503 is selected. The digital representation of source A (i.e., the corresponding data models) is the same as in FIG. 6A. Assuming that all other mapping strategies in the predefined set of mapping strategies lead to very low similarity measures, the mapping rules of the maximizing strategy may provide a fall back mapping strategy to be used as an intermediate step in the model mapping between the different digital twin formats. In the example 603, each source leaf element is simply assigned as a single target leaf element to a separate sub-model in the target model template. Such single model leaf elements need to be merged into respective sub-models at a later point in time. This merging step may be executed in response to receiving a corresponding mapping input from a human domain expert, or it may be performed by a machine learning algorithm, a customizing application or another appropriate rule set. The maximizing mapping strategy may be selected by the mapping module if all other mapping strategies fail to generate target model templates with similarity measures indicating a substantial similarity with the target format of the digital twin of the target entity. In such a case the strategy is selected to generate an intermediate format B' which serves as a basis for further customizing the mapping rules to improve future automated mappings which can finally be used for mapping the source models to the data models of the target entity.

Figure 6D:
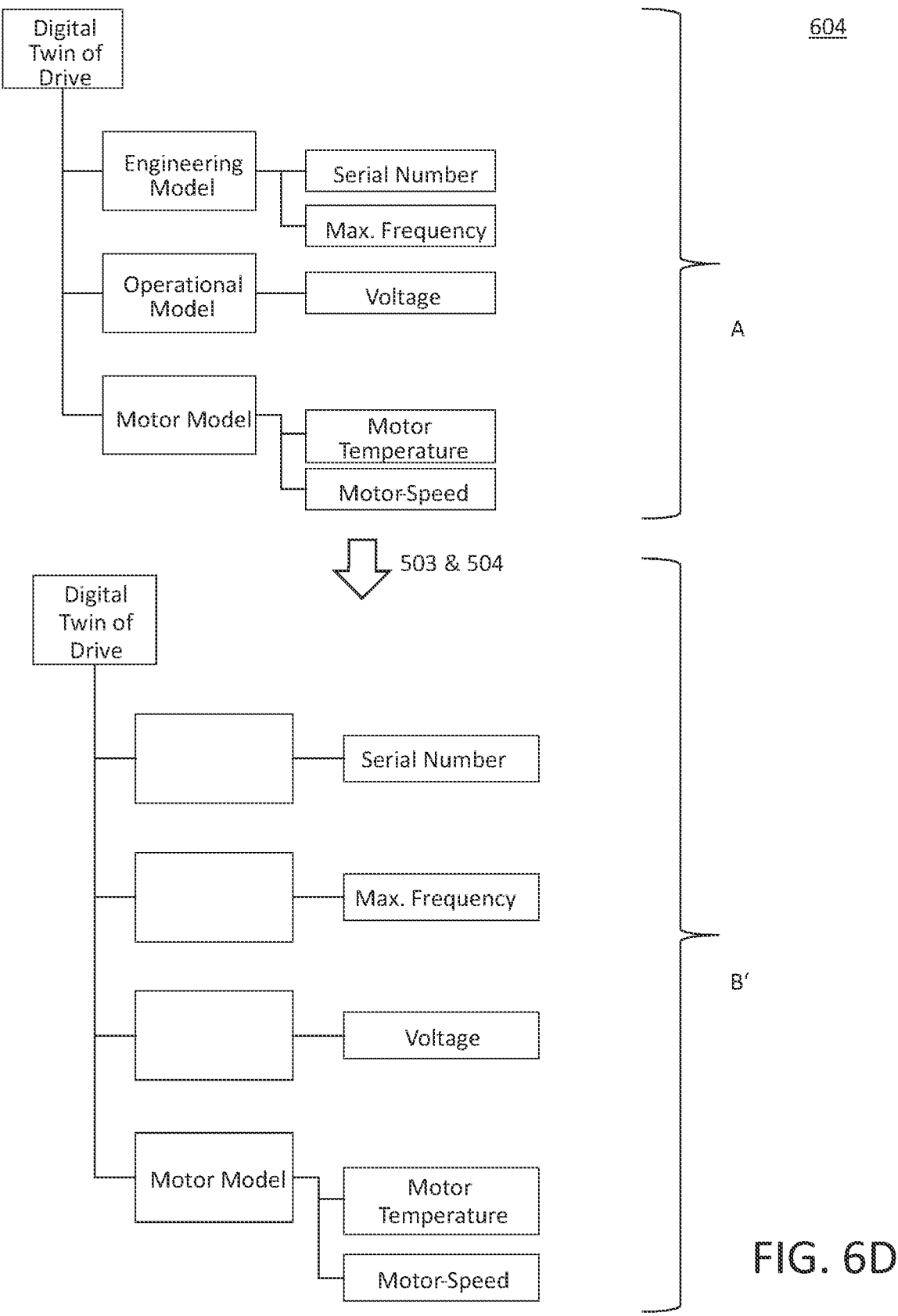

FIG. 6D illustrates an example 604 where two mapping strategies are partially applied for generating the target model template by combining the maximizing mapping strategy 503 with a second mapping strategy (e.g., structure-preserving mapping or name-based mapping 504). In the example, 604 the evaluation of the name-based strategy leads to a 100" similarity measure for the "Motor Model" whereas the overall similarity measure for name-based strategy is low (e.g., 40% because only two out of five model leaf elements can be mapped). In such a case, the mapping module may still select a mapping strategy for a part of digital twins where a high similarity degree is determined for one or more sub models. For the remaining nodes, the maximizing strategy 503 may be selected to generate an intermediate format B' as a basis for further customizing as explained in FIG. 6C.

FIG. 7 is a diagram that shows an example of a generic computer device 900 and a generic mobile computer device 950, which may be used with the techniques described here.

Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may be used as a GUI frontend for a user to customize the mapping rules. The components shown here, their connections and relationships, and their functions, are meant to be exemplary only, and are not meant to limit implementations of the inventions described herein.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards. In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device, such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver. In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for interoperable data exchange between a first real-world entity and a second real-world entity with both real-world entities connected to a same communication network, the first and second real-world entities having first and second digital representations, respectively, each digital representation being a virtual entity replicating data, structure, and functions associated with any one of the real-world entities, the first and the second digital representations having different formats, the method, executed by at least one computing device of the second real-world entity, comprising:
receiving a request for data of the second digital representation to be provided to the first digital representation;
evaluating a set of predefined mapping strategies with each mapping strategy being associated with a target model template indicating the structure and semantics of a target data model into which the respective mapping strategy can transform a corresponding source data model, by determining a mapping similarity measure for each mapping strategy based on similarities in a structure and semantics of respective data models of the first and second digital representations with the corresponding target model templates, providing a quantitative measure for the suitability of the respective mapping strategy to generate an appropriate mapping for a desired model transformation;
generating a mapping between a format of the first digital representation and a format of the second digital representation, by:
selecting at least one mapping strategy from the set of predefined mapping strategies based on at least one highest determined mapping similarity measure,
mapping the one or more data models which are associated with the requested data of the of the second digital representation to the corresponding one or more data models of the first digital representation by executing the at least one selected mapping strategy, and
providing the requested data to the first real-world entity in accordance with the format of the first digital representation via the mapping.

2. The method of claim 1, wherein the request is associated with a data request of an application.

3. The method of claim 1, wherein the set of predefined mapping strategies comprises at least two of the following strategies:
a structure-preserving mapping strategy configured to generate a mapping when a structure of the first digital representation resembles a structure of the second digital representation in accordance with a corresponding target model template;
a minimizing mapping strategy configured to generate a mapping of the second digital representation data models to a minimum number of first digital representation data models in accordance with a corresponding target model template;
a maximizing mapping strategy configured to generate a mapping of the second digital representation data models to a maximum number of first digital representation data models in accordance with a corresponding target model template;
a name-based-heuristics mapping strategy configured to generate a mapping to the first digital representation based on domain-specific, customizable heuristics regarding a naming of the elements in the second digital representation in accordance with a corresponding target model template; and
a semantic-references-based mapping strategy configured to generate a mapping to the first digital representation based on heuristics regarding semantic references assignable to elements in the second digital representation in accordance with a corresponding target model template.

4. The method of claim 1, wherein the predefined mapping strategies are part of a knowledge base, and
wherein the method further comprises:
optimizing the knowledge base after each mapping generation by using a machine learning method which incorporates mapping knowledge learned from previously generated mappings.

5. The method of claim 1, wherein the mapping is persisted in a separate mapping model which is independent of the formats as a persisted mapping,
wherein the method further comprises:
adjusting the persisted mapping in case of a change detected in the format of the first or second digital representation.

6. The method of claim 5, further comprising:
receiving customizing input for the persisted mapping; and
adjusting the persisted mapping in accordance with the customizing input.

7. The method of claim 1, wherein the request is received from the first digital representation.

8. The method of claim 1, wherein the request is triggered by a change of the data values of the second digital representation at runtime, and
wherein generating the mapping includes:
re-executing the mapping in accordance with the change; and
providing the requested data includes notifying the first digital representation about the change.

9. The method of claim 1, wherein the generated mapping is bidirectional and configured to be applied to a further request from the first digital representation to push data of the first digital representation to the second digital representation.

10. A computer program product comprising instructions that, when loaded into a memory of a computing device and executed by at least one processor of the computing device, execute the method of claim 1.

11. A computer system for interoperable data exchange between a first real-world entity and a second real-world entity with both real-world entities connected to the same communication network, the first and second real-world entities having first and second digital representations, respectively, each digital representation being a virtual entity replicating data, structure, and functions associated with any one of the real-world entities, the first and the second digital representations having different formats, the computer system comprising one or more processors configured to:

receive a request for data of the second digital representation to be provided to the first digital representation, and to provide the requested data to the first real-world entity in accordance with a format of the first digital representation via a mapping;

evaluate a set of predefined mapping strategies with each mapping strategy being associated with a target model template indicating the structure and semantics of a target data model into which the respective mapping strategy can transform a corresponding source data model, by determining a mapping similarity measure for each mapping strategy based on similarities in a structure and semantics of respective data models of the first and second digital representations with the corresponding target model templates, providing a measure for the suitability of the respective mapping strategy to generate an appropriate mapping for a desired model transformation; and generate the mapping between the format of the first digital representation and a format of the second digital representation, by:
  selecting at least one mapping strategy from the set of predefined mapping strategies based on at least one highest determined mapping similarity measure; and
  mapping the one or more data models which are associated with the requested data of the second digital representation to the corresponding one or more data models of the first digital representation by executing the at least one selected mapping strategy.

12. The system of claim 11, wherein the set of predefined mapping strategies comprises at least two of the following strategies:
  a structure-preserving mapping strategy configured to generate a mapping when the structure of the first digital representation resembles a structure of the second digital representation in accordance with a corresponding target model template;
  a minimizing mapping strategy configured to generate a mapping of the second digital representation data models to a minimum number of first digital representation data models in accordance with a corresponding target model template;
  a maximizing mapping strategy configured to generate a mapping of the second digital representation data models to a maximum number of first digital representation data models in accordance with a corresponding target model template;
  a name-based-heuristics mapping strategy configured to generate a mapping to the first digital representation based on domain-specific, customizable heuristics regarding a naming of the elements in the second digital representation in accordance with a corresponding target model template; and
  a semantic-references-based mapping strategy configured to generate a mapping to the first digital representation based on heuristics regarding semantic references assignable to elements in the second digital representation models in accordance with a corresponding target model template.

13. The system of claim 11, wherein the mapping is persisted in a separate mapping model which is independent of the formats as a persisted mapping, and
  the one or more processors are configured to adjust the persisted mapping in case of a change detected in the format of the first or second digital representation.

14. The system of claim 11, wherein an import request is triggered by a change of data values of the second digital representation at runtime, and the one or more processors are further configured to:
  re-execute the mapping in accordance with the change, and
  provide the requested data and notify the first digital representation about the change.

* * * * *